May 16, 1961 M. T. WHYTE ET AL 2,984,320
MECHANICAL BRAKE
Filed Nov. 4, 1959 2 Sheets-Sheet 1

INVENTORS
John H. Dreymiller
Melvin T. Whyte
By George A. Woodruff
Atty.

May 16, 1961  M. T. WHYTE ET AL  2,984,320
MECHANICAL BRAKE

Filed Nov. 4, 1959  2 Sheets-Sheet 2

INVENTORS
John H. Dreymiller
Melvin T. Whyte
By George A. Woodruff
Atty.

United States Patent Office 2,984,320
Patented May 16, 1961

2,984,320

MECHANICAL BRAKE

Melvin T. Whyte and John H. Dreymiller, Beloit, Wis., assignors to Fairbanks, Morse & Co., Chicago, Ill., a corporation of Illinois Filed Nov. 4, 1959, Ser. No. 850,847

1 Claim. (Cl. 188—78)

This invention relates to improvements in mechanical brakes, and more particularly to an improved and highly effective brake device provided as a compact unit having ready application to small engine powered vehicles such as tractors, riding mowers, golf carts, racing carts, and the like, as well as to power tools and other equipment and apparatus requiring brake means.

The general object of the invention is to provide for a compact, rugged and highly effective brake unit which may be easily embodied in original equipment or easily applied to existing equipment in the field.

A more specific object is to provide an improved brake of unit character, operatively associatable with a rotary member such as a ground wheel, gear wheel, etc., and comprising in presently preferred embodiment, a brake drum element adapted for mounting on the rotary member coaxial with the axle or shaft thereof, a brake hub element sleevable on the axle or shaft and held in a stationary condition relative to the rotary member, a brake shoe support or carriage pivotally mounted on one of the elements, brake shoes retained by the support or carriage between the drum and hub elements and biased away from braking contact with the drum element, and cam means on the hub element engageable by the brake shoes in pivotal movement of the support or carriage from a neutral or non-braking position, for causing displacement of the brake shoes into braking contact with the drum element.

The foregoing and other objects and advantages of the present invention will appear from the following description of one embodiment thereof as exemplified in the accompanying drawing, wherein.

Figure 2:
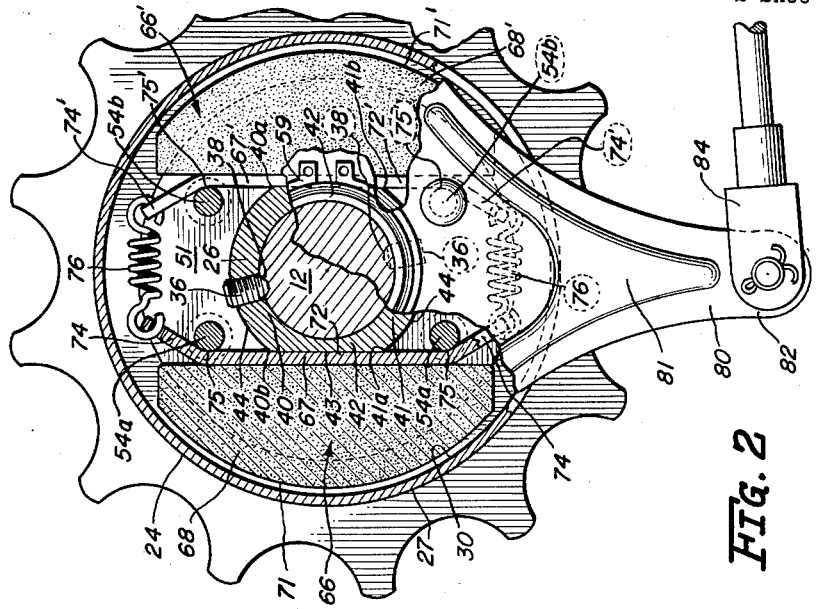
Fig. 2 is a sectional view of the brake device, as taken from line 2—2 in Fig. 1; with portions in elevation.
Figure 1:
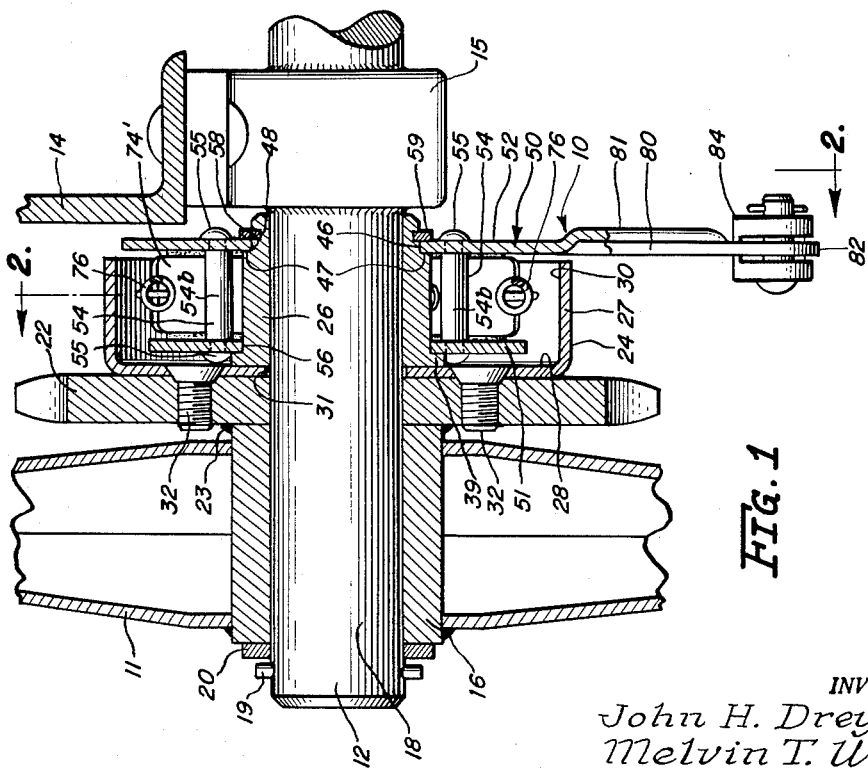
Fig. 1 is a fragmentary view partly in section and partly in elevation, of a wheel and axle provision for a wheel supported device or vehicle, illustrating a brake device according to the present invention in application thereto, the brake being shown in transverse sectional elevation.

Referring to Figs. 1 and 2, a brake device constructed in accordance with the present invention, is shown at 10 in application to a wheel 11 and its axle 12. Wheel 11 may be a ground wheel of a cart or the like, having a fixed or non-rotating axle 12 attached to the cart frame part 14 by means of a suitable bracket 15. The wheel through its central or hub member 16, is rotatable on the outer end portion 18 of the axle 12 and retained thereon as by a cotter pin 19 and washer 20. In the example of Fig. 1, wheel 11 may be power-driven and for such purpose, is provided with a driven sprocket 22 suitably attached to the wheel hub 16, as by welding at 23.

Figure 3:
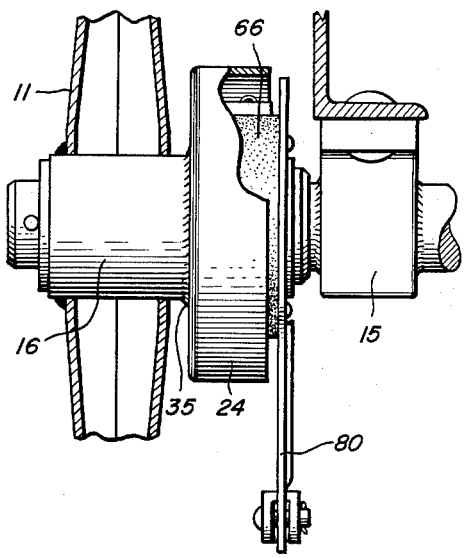
Fig. 3 is fragmentary detail view partly in section, showing direct attachment of the brake drum part of the present brake, to a wheel hub.

Operatively associated with wheel 11 is the brake 10 now to be described. The brake in its presently preferred form as illustrated, includes a brake drum element 24 and a central brake hub element 26. Drum 24 is a circular cup-shaped element formed in one piece of suitable rigid material, as steel, to provide an annular flange or rim 27 at the outer end of the drum disc 28, the inner circular surface 30 of the rim providing a braking surface for engagement by brake shoe means presently to appear. The drum having a central opening 31 to clear the axle 12 therethrough, is mounted on the sprocket 22 in a position such that its braking surface 30 is coaxial with the axle 12. Sprocket mounting of the drum may be effected in any desired manner, as by a suitable number of bolts 32 shown in the example of Fig. 1, or by welding as indicated at 34 in the example of Fig. 4 later to be described. It will be readily understood, of course, that where the wheel to which the present brake is applied, is not power driven or is driven in a manner other than through a sprocket attached to the wheel hub, the brake drum may be attached directly to an adjacent part of the wheel. Fig. 3 for example, illustrates direct attachment of the brake drum to the wheel hub, as by welding at 35.

The brake hub 26 is a one-piece ring-like element formed of suitable rigid material, as steel or the like, and sleeved on the axle 12 to underlie the drum flange or rim 27. It is suitably fixed to the axle so as to be stationary relative to the drum 24 and hence the wheel 11, hub securement being here effected as by one or more set screws 36 threaded in the hub to frictional engagement with the axle. Preferably, the axle is recessed as at 38 (Fig. 2), to form seats for the inner ends of the set screws, whereby the set screws may firmly key the brake hub to the axle.

In the illustrated embodiment of the present invention, brake hub 26 affords both an operative mounting for a brake shoe support or carriage, and camming means for braking actuation of the brake shoe means. As appears in Figs. 1 and 2, the hub provides a circular flange 39 at its inner end adjacent the drum disc 28, while the hub body presents diametrically opposite circular portions 40 and 41, and intervening diametrically opposite portions 42, the latter presenting flat or planar surfaces 43 which are parallel and equidistant from the hub axis. Hub portions 40 and 41 have arcuate surfaces 44 formed on equal radii, these portions providing cam means for brake shoe actuation in a manner to be described. The surfaces 44 and the intervening flat surfaces 43 in their extent axially of the hub, thus are normal to the plane of the hub flange 39. The outer end of the hub is circular, providing a circular seat 46 which is shouldered by the adjacent ends 47 of the portions 40 and 41, and affording an annular groove 48 adjacent seat 46, both for a purpose to appear.

Mounted on the brake hub for angular or rocking movement about the axis, is a brake shoe support or carriage 50. The carriage comprises a pair of disc-form plates 51 and 52 of suitable material, as steel or the like, arranged in rigid coaxial and spaced apart assembly effected by a plurality of studs or pins 54 therebetween. The studs or pins may be shouldered at the ends thereof, to engage the inside faces of the plates and have their outer ends peened or upset to form rivet heads 55 in clamping contact with the outer faces of the plates. The plates are parallel and centrally apertured, plate 51 having central circular aperture 56 of a diameter to accommodate the hub portions 40 and 41, and plate 52 having central circular aperture 58 of a diameter approximating that of hub seat 46. Moreover, the plates are spaced apart by the connecting pins 54 such that in mounted position of the carriage on the brake hub, the plate 51 is closely adjacent the brake flange 39 with the margin of its central aperture 56 pivotally seating on the hub portions 40 and 41, while the plate 52 has the margin of its central aperture 58 pivotally engaged on the hub seat 46 adjacent hub shoulders 47. Retention of the carriage in rockable or pivotal support on the brake hub is effected by a suitable snap ring 59 removably received in the hub groove 48. As appears in Fig. 1, the carriage in its hub mounted position, has the plate 52 axially spaced from the open end of the brake drum 24, affording suitable clearance to avoid relative contact of these parts.

In the carriage structure shown, the plate connecting pins 54 serve also as seats for the brake shoe means supported by the carriage. To this end, the pins are arranged in diametrically opposite pairs, as the pair $54a$ on one side of the hub axis and the pair $54b$ on the opposite side thereof. Confined between the plate 51—52 and outwardly overlying the pair of pins $54a$ is a first brake shoe assembly 66 comprised of a backing plate 67 and a block-like brake shoe element 68 suitably secured to the backing plate, as by one or more screws (not shown). The shoe 68 provides an outer arcuate face 71 opposed to the inner braking surface 30 of the brake drum 24, for braking contact therewith in actuation of the brake as will appear presently. The brake shoe further, may be a one-piece block of suitable friction-braking material, or only the outer portion thereof along the arcuate face 71 may be of such material, whichever is preferred. Backing plate 67 provides a straight or rectilinear body portion 72 of a length to span the associated pair of pins $54a$, and has the opposite ends 74 thereof bent or turned at an angle inwardly from the base of the shoe, to form pin seats 75 for receiving the pins $54a$. The location of the pins $54a$ in the carriage structure is predetermined in relation to the brake hub 26, such that in the pin engaged condition of the brake shoe having the pins $54a$ in the shoe seats 75, the shoe will be in retracted position having its arcuate face 71 substantially uniformly clear of or spaced from the drum surface 30, and the straight body 72 of the shoe backing plate opposite to or in contact with one of the flat portions 42 of the hub.

A like shoe assembly $66^1$ including shoe element $68^1$ and the backing plate $67^1$ having bent ends $74^1$ forming seats $75^1$ is associated with the opposite pair of pins $54b$ and the opposite flat portion 42 of the brake hub in the manner above described for the shoe 66. Both shoes 66 and $66^1$ are uniformly loaded or biased to pin-engaged retracted positions, by a pair of equal force springs 76 in tension between the shoe backing plates. As shown in Fig. 2, one such spring spans one adjacent pair of backing plate ends 74—$74^1$, while the other spring is similarly related to the other adjacent pair of backing plate ends, the plate ends 74—$74^1$ being apertured to receive the ends of the associated springs.

As will be now observed, the non-braking or neutral position of the brake shoe carriage is that in which the brake shoes are spring-retracted to seating on the carriage pins with the shoe backing plate body portions 72 and $72^1$ opposed to or in contact with the flat sides 42 of the brake hub 26. Now, upon angular displacement of the shoe carriage pivotally on the brake hub from the aforesaid neutral position, and considering first counter-clockwise movement of the carriage as viewed in Fig. 2, the brake shoes 66 and $66^1$ are thereby brought into brake-effecting association with the cam means 40 and 41 of the brake hub. In the selected counter-clockwise movement of the carriage, the backing plate 67 of shoe 66 engages the corner region or nose $41a$ of hub portion 41 and tends to ride thereover onto the adjacent portion of hub surface 44, while backing plate $67^1$ of shoe $66^1$ similarly engages and tends to ride over the corner region or nose $40a$ of hub portion 40 to the adjacent surface 44 of the latter. As the above takes place, the shoes are thereby forced outwardly against the retracting tension of the springs 76, to braking engagement of the shoe surfaces 71 and $71^1$ with the internal face or surface 30 of the brake drum.

In the illustrated brake embodiment, shoe engagement with the associated hub cam nose occurs at a point on the shoe backing plate which is nearer one of the associated shoe pins ($54a$—$54b$). Therefore, each shoe in its braking displacement undergoes, initially, pivotal movement about the more remote one of its associated pins ($54a$—$54b$) as an axis, until the shoe contacts the brake drum. Whereupon and with further pivoting of the carriage from its neutral position, each shoe is forced by the associated cam nose into full surface engagement with the brake drum.

It is appreciated, of course, that each shoe as it engages the brake drum, tends to follow or rotate with the drum, hence turn relative to and about the axis of the shoe carriage. Such shoe movement, however, is here limited to a very small amount, being restricted by contact of one of the bent ends 74 on backing plate 67 of shoe 66 with one of the associated pins $54a$ (depending on the direction of brake drum rotation), and likewise by contact of one bent end $74^1$ on backing plate $67^1$ of shoe $66^1$ with one of its associated pins $54b$. Moreover, in so restricting angular movements of the brake shoes relative to the carriage, a camming action takes place at the engaged pin and bent end of the shoe backing plate, tending to force each shoe against the brake drum, thus aiding the braking function.

In the above description of braking operation, pivotal movement of the brake carriage in the counter-clockwise direction from neutral (as viewed in Fig. 2) was assumed. The same manner of operation occurs when the carriage is pivoted in the opposite, or clockwise, direction from neutral. However, in this instance the opposite corner region or cam nose $40b$ of hub portion 40 is effective in respect to the shoe 66, while the opposite corner region or cam nose $41b$ of hub portion 41 is effective as to shoe $66^1$.

Braking displacement of the shoe carriage 50 may be effected in any suitable manner and either manually or by power means, as desired. In the presently illustrated embodiment, the carriage plate 52 is formed to provide an operating arm 80 integral therewith and extending conveniently, although not necessarily, in the plane of the plate. The arm may be strengthened in its projection from the plate, as by the press-formed ribbing 81. Any suitable actuating member or linkage is connected to the free end 82 of the arm, such member or linkage not being here illustrated except for an end portion 84 shown in pinned connection to the arm.

Upon linkage actuation of the carriage 50 in either direction from the neutral position, the hereindescribed braking action occurs, resulting normally in stoppage of the brake drum and the wheel or other member to which it is connected. The brake actuating force applied through arm 80 must, of course, exceed the maximum retracting force imposed on the shoes by the springs 76, established when the shoes are in full braking contact with the brake drum. So long as such force is maintained, the shoes will remain in braking engagement with the drum.

To release the brake, the linkage may be actuated in the direction returning the brake carriage to neutral position, the shoe retracting springs 76 then aiding this action. However, the presently improved brake is inherently self-returnable to non-braking or neutral condition. When the brake shoes are in cam-actuated braking positions, the then extended springs 76 impose very little material return forces on the shoes, tending to pivot the shoes on the engaged cam nose portion of the brake hub, in the direction to cause pivotal return of the carriage to neutral position. Hence, for brake release, it is necessary only to free the actuating linkage (relieve it from the brake applying force), whereupon the springs 76 will cause automatic return of the shoe carriage to neutral or brake-off position.

Figure 4:
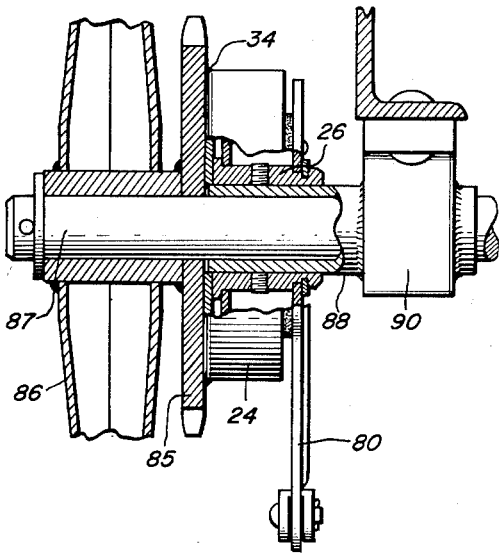
Fig. 4 is a fragmentary view similar to that of Fig. 1, but illustrating the brake in application to a power driven wheel on a rotary axle.

Fig. 4 illustrates the presently improved brake in application to the sprocket 85 of a power driven wheel 86 mounted on a rotating axle 87. As here applied, the brake drum 24 is preferably welded at 34 to the sprocket, while the brake hub 26 is seated on and suitably secured to the stationary axle bearing housing 88 carried by bracket 90.

Figure 5:
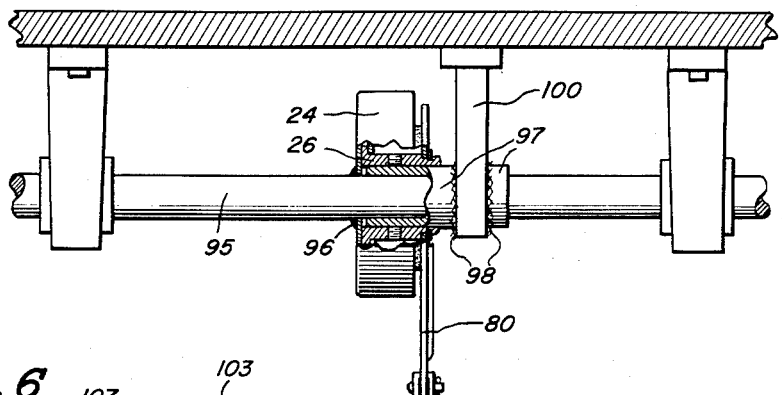
Fig. 5 is a fragmentary elevational view of a jackshaft assembly having the brake of the present invention applied thereto, the brake being shown only partly in transverse section.

Fig. 5 shows the present brake in application to a powered jackshaft 95. Here the brake drum 24 is welded to the shaft at 96, while the brake hub 26 is provided with an axial extension portion 97 welded at 98 to a fixed bracket 100.

Figure 6:
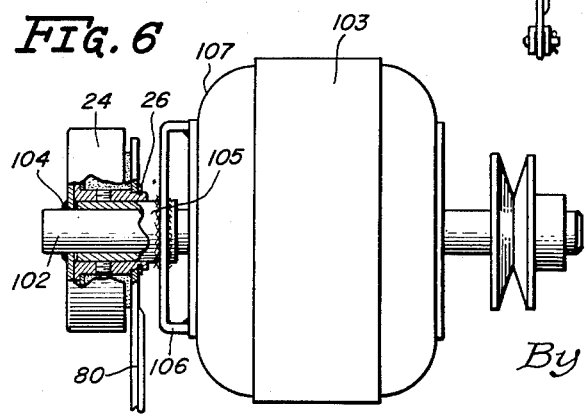
Fig. 6 illustrates the brake (shown only partly in transverse section) in application to an electric motor.

Fig. 6 illustrates the brake as applied to the shaft 102 of an electric motor 103. In this application, the brake drum is welded at 104 to the motor shaft, and the brake hub 26 has an extension 105 welded to a bracket 106 on the motor frame 107.

Obviously, the present brake is capable of many other applications too numerous to suggest here. Furthermore, it should now appear that the improved and compact brake device herein shown and described, is well suited for ready and easily effected installations in the field on existing equipment requiring effective brake means. Also, the character of its construction is such as to facilitate access to the brake parts, as for inspection and repair or replacement purposes.

Having now described and illustrated the presently improved brake as to one embodiment thereof, it is to be understood that various alterations and modifications may be made therein without departing from the spirit and scope of the invention as hereinafter defined.

What is claimed is:

A brake unit in combination with a fixed shaft and a rotary member rotatable about the axis of the shaft, a brake drum on said rotary member providing a circular braking surface coaxial with the shaft, a brake hub fixed on said shaft, a brake shoe support carried solely by said brake hub in pivotally mounted position thereon, said support providing seat means on opposite sides of the hub, a brake shoe between each seat means and said braking surface of the brake drum, yieldable means interconnecting the brake shoes and biasing the latter to seating engagement on said seat means, the brake shoes when on said seat means being out of braking contact with said braking surface, said support being pivotally movable to and from a non-braking position wherein said brake shoes are seated on the seat means, and cams on diametrically opposite sides of said brake hub engaged by the brake shoes upon pivotal movement of said support from said non-braking position thereof, to effect displacement of the brake shoes to braking contact with said braking surface of the brake drum.

References Cited in the file of this patent

UNITED STATES PATENTS

| | | |
|---|---|---|
| 867,057 | Lansden | Sept. 24, 1907 |
| 947,477 | Wilcox et al. | Jan. 25, 1910 |

FOREIGN PATENTS

| | | |
|---|---|---|
| 54,057 | Netherlands | Mar. 15, 1943 |